(12) United States Patent
Langlotz et al.

(10) Patent No.: US 9,040,609 B2
(45) Date of Patent: May 26, 2015

(54) POWDERED ACCELERATOR

(75) Inventors: Jutta Karin Langlotz, Trostberg (DE);
Stefan Friedrich, Garching (DE);
Christoph Hesse, Ebersberg (DE)

(73) Assignee: Construction Research & Technology GmbH, Trostberg (DE)

( * ) Notice: Subject to any disclaimer, the term of this patent is extended or adjusted under 35 U.S.C. 154(b) by 118 days.

(21) Appl. No.: 13/988,693

(22) PCT Filed: Nov. 23, 2011

(86) PCT No.: PCT/EP2011/070820
§ 371 (c)(1),
(2), (4) Date: Aug. 6, 2013

(87) PCT Pub. No.: WO2012/072466
PCT Pub. Date: Jun. 7, 2012

(65) Prior Publication Data
US 2014/0066546 A1    Mar. 6, 2014

(30) Foreign Application Priority Data
Nov. 29, 2010 (EP) .................................. 10192923

(51) Int. Cl.
*C04B 24/26* (2006.01)
*C04B 28/02* (2006.01)
*C04B 40/00* (2006.01)
C04B 103/00 (2006.01)
C04B 103/14 (2006.01)
C04B 103/52 (2006.01)

(52) U.S. Cl.
CPC ............ *C04B 24/2652* (2013.01); *C04B 28/02* (2013.01); *C04B 40/0042* (2013.01); *C04B 2103/0062* (2013.01); *C04B 2103/14* (2013.01); *C04B 2103/52* (2013.01)

(58) Field of Classification Search
None
See application file for complete search history.

(56) References Cited

U.S. PATENT DOCUMENTS

| | | | |
|---|---|---|---|
| 5,332,041 A | 7/1994 | Onan et al. | |
| 5,355,954 A | 10/1994 | Onan et al. | |
| 5,360,841 A | 11/1994 | Knop et al. | |
| 5,413,634 A | 5/1995 | Shawl et al. | |
| 5,609,680 A | 3/1997 | Kobayashi et al. | |
| 5,709,743 A | 1/1998 | Leture et al. | |
| 5,925,184 A | 7/1999 | Hirata et al. | |
| 6,170,574 B1 | 1/2001 | Jones | |
| 6,832,652 B1 | 12/2004 | Dillenbeck et al. | |
| 7,041,167 B2 | 5/2006 | Jiang | |
| 7,258,736 B2 | 8/2007 | Oriakhi et al. | |
| 7,605,196 B2 | 10/2009 | Schinabeck et al. | |
| 7,641,731 B2 | 1/2010 | Chanut et al. | |
| 7,772,300 B2 | 8/2010 | Schinabeck et al. | |
| 8,349,960 B2 | 1/2013 | Gaeberlein et al. | |
| 8,436,072 B2 | 5/2013 | Herth et al. | |
| 2002/0129743 A1 | 9/2002 | Frailey et al. | |
| 2002/0166479 A1 | 11/2002 | Jiang | |
| 2004/0261664 A1 | 12/2004 | Oriakhi et al. | |
| 2007/0032550 A1 | 2/2007 | Lewis et al. | |
| 2007/0163470 A1 | 7/2007 | Chanut et al. | |
| 2008/0022940 A1* | 1/2008 | Kirsch et al. ................... | 119/173 |
| 2008/0108732 A1 | 5/2008 | Wieland et al. | |
| 2008/0200590 A1 | 8/2008 | Schinabeck et al. | |
| 2008/0319217 A1 | 12/2008 | Ingrisch et al. | |
| 2009/0054558 A1 | 2/2009 | Wieland et al. | |
| 2009/0186964 A1 | 7/2009 | Schinabeck et al. | |
| 2010/0190888 A1 | 7/2010 | Gaeberlein et al. | |
| 2011/0015301 A1 | 1/2011 | Hert et al. | |
| 2011/0095227 A1* | 4/2011 | Herth et al. ................... | 252/194 |
| 2011/0160393 A1 | 6/2011 | Sakamoto et al. | |
| 2011/0269875 A1 | 11/2011 | Nicoleau et al. | |
| 2012/0270969 A1 | 10/2012 | Bichler et al. | |
| 2012/0270970 A1 | 10/2012 | Bichler et al. | |

FOREIGN PATENT DOCUMENTS

| | | |
|---|---|---|
| CA | 2071051 | 12/1992 |
| CA | 2172004 | 9/1996 |
| DE | 35 27 981 A1 | 2/1987 |
| DE | 43 42 407 A1 | 6/1995 |
| DE | 4411797 A1 | 10/1995 |
| DE | 197 24 700 A1 | 12/1998 |
| DE | 10351259 A1 * | 6/2005 |
| DE | 102004050395 A1 | 4/2006 |
| DE | 10 2005 001 101 A1 | 7/2006 |
| DE | 20 2006 018 797 U1 | 12/2006 |
| DE | 10 2005 051 375 A1 | 5/2007 |
| DE | 102006041552 A1 * | 3/2008 |
| DE | 10 2007 027 470 A1 | 12/2008 |
| EP | 0 403 974 A1 | 12/1990 |

(Continued)

OTHER PUBLICATIONS http://en.wikipedia.org/wiki/Superabsorbent_polymer, p. 1, Nov. 2014.*
DE 102006041552 A1, Mar. 2008.*
JP 2003292357 A, Oct. 2003.*
DE 10351259 A1, Jun. 2005.*
PCT/EP2009/061334; International Search Report, Jan. 25, 2010.
PCT/EP2009/061334; International Written Opinion, Jan. 25, 2010.
PCT/EP2009/061334; International Preliminary Report on Patentability, Mar. 8, 2011.
PCT/EP2011/053349; International Search Report, Jul. 29, 2011.
PCT/EP2011/053349; International Written Opinion, Jul. 29, 2011.
PCT/EP2011/053349; International Preliminary Report on Patentability, Sep. 25, 2012.

(Continued)

*Primary Examiner* — Satya Sastri
(74) *Attorney, Agent, or Firm* — Curatolo Sidoti Co., LPA; Joseph G. Curatolo; Salvatore A. Sidoti

(57) ABSTRACT

The present invention relates to a solid composition containing calcium silicate hydrate and at least one water-swellable polymer which can form a hydrogel, and also to a process for preparing the composition, to the use thereof as a setting accelerator, and as a grinding aid in cement production. It also relates to building material mixtures which comprise the compositions.

20 Claims, No Drawings

(56) References Cited

FOREIGN PATENT DOCUMENTS

| | | |
|---|---|---|
| EP | 0 518 156 A2 | 12/1992 |
| EP | 0 605 257 A1 | 12/1993 |
| EP | 0 637 574 A1 | 2/1995 |
| EP | 1138697 A1 | 10/2001 |
| EP | 1 491 516 A2 | 12/2004 |
| EP | 1655272 | 5/2006 |
| EP | 2 325 231 A1 | 5/2011 |
| JP | 2000095554 A | 4/2000 |
| JP | 2001058863 A | 3/2001 |
| JP | 2003292357 A * | 10/2003 |
| JP | 2008127247 | 6/2008 |
| WO | WO 02/070425 A1 | 9/2002 |
| WO | WO 2005/077857 A2 | 8/2005 |
| WO | WO 2005/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2009156229 A2 * | 12/2009 |
| WO | WO 2010/028155 A1 | 3/2010 |
| WO | WO 2011/006837 A1 | 1/2011 |
| WO | WO 2011/026720 A1 | 3/2011 |
| WO | WO 2011/026825 A2 | 3/2011 |
| WO | WO 2011/028825 A2 | 3/2011 |

OTHER PUBLICATIONS

PCT/EP2010/061809; International Search Report; Nov. 24, 2010.
PCT/EP2010/061809; International Written Opinion; Nov. 24, 2010.
PCT/EP2010/061809; International Preliminary Report on Patentability; Mar. 6, 2012.
PCT/EP2010/061762; International Search Report; Dec. 21, 2010.
PCT/EP2010/061762; International Written Opinion; Dec. 21, 2010.
PCT/EP2010/061762; International Preliminary Report on Patentability, Mar. 6, 2012.
EP 01863468.5, priority document, Sep. 2, 2008.
Cölfen, Helmut; "Analytical Ultracentrifugation of Nanoparticles"; Polymer News; 2004; vol. 29; p. 101-116; Taylor & Francis; Abstract.
Saito, Fumio, et al.; "Mechanochemical Synthesis of Hydrated Calcium Silicates by Room Temperature Grinding"; Solid State Ionics; 1997; pp. 37-43; Elsevier.
"Silica"; Ullmann's Encyclopedia of Industrial Chemistry; 2002; Wiley-VCH Verlag GmbH & Co. KGaA; Abstract.
Final Office Action for U.S. Appl. No. 13/451,024 mailed Jan. 28, 2014.
Non-Final Office Action for U.S. Appl. No. 13/451,024 mailed Jul. 8, 2014.
Non-Final Office Action for U.S. Appl. No. 13/451,024 mailed Sep. 16, 2013.
Non Final Office Action for U.S. Appl. No. 13/035,281 mailed on Jun. 5, 2013.
Final Office Action for U.S. Patent Application Serial No. 13/035, mailed Dec. 17, 2013.
Final Office Action for U.S. Appl. No. 13/035,281 mailed Apr. 15, 2014.
Non-Final Office Action for U.S. Appl. No. 13/035,281 mailed Sep. 25, 2014.
Non-Final Office Action for U.S. Appl. No. 13/392,988 mailed Aug. 1, 2014.
PCT/EP2011/070820—International Search Report, Apr. 2, 2012.
PCT/EP2011/070820—International Written Opinion, Apr. 2, 2012.
PCT/EP2011/070820—International Preliminary Report on Patentability, Jun. 4, 2013.

* cited by examiner

POWDERED ACCELERATOR

CROSS REFERENCE TO RELATED APPLICATIONS

This application is a national stage application of International Application No. PCT/EP2011/070820, filed 23 Nov. 2011, which claims priority from European Patent Application No. 10192923.0, filed 29 Nov. 2010, from which applications priority is claimed, and which are incorporated herein by reference.

The present invention relates to a solid composition containing calcium silicate hydrate and at least one water-swellable polymer which can form a hydrogel, and also to a process for preparing the composition, to the use thereof as a setting accelerator, and to the use as a grinding aid in the production of cement. The invention also relates to dividing material mixtures which comprise the compositions.

Pulverulent setting accelerators for cementitious building material mixtures, which are suitable in principle for use in dry mortar mixtures, are known in the prior art. Examples of such accelerators are calcium nitrate, calcium formate, calcium chloride and lithium carbonate. One disadvantage of chloride or nitrate containing accelerators is the adverse effects thereof on the corrosion resistance of, for example, steel-reinforced concrete. Due to national standards, there are restrictions for their use. Efflorescence on the surface of hardened building materials can likewise be a problem, especially in the case of use of calcium salts (for example calcium formate).

In many applications, there is the need to achieve even greater acceleration of setting and higher early strengths in cementitious systems, for example in mortar or concrete. The abovementioned accelerator types and other accelerators commercially available, however, do not currently enable the person skilled in the art to achieve this aim; even with the commercially available accelerators, a undesired loss of final strength is observed, particularly at relatively high dosages. There is thus a great need to achieve higher early strengths in many applications, which is not possible with the accelerators currently known in the prior art.

Suspensions of calcium silicate hydrate (C-S-H) have been used in recent times as a highly efficient accelerator in cementitious building material mixtures. They enable significantly higher early strengths (6 hours) compared to the accelerators commercially available. At the same time, essentially no decrease in the final strengths (28 days) is observed. Corresponding suspensions are described in WO 2010026155 A1. However, it is not possible for practical reasons to formulate dry mortar mixtures which comprise essentially cement as a binder with the aqueous dispersions of calcium silicate hydrate (C-S-H), since the water content would lead to an unacceptable, at least partially premature hydration of the binder.

In the technical field of cementitious dry mortar mixtures, and likewise for non-dry mortar applications such as concrete, there is a great demand for suitable, highly effective accelerators in order thus to enable a distinct increase in early strengths in dry mortar systems too, preferably without losses in the final strengths (strengths after 28 days).

The object of the present invention is thus to provide accelerators which overcome the aforementioned disadvantages of the prior art. More particularly, the accelerators should enable an effective enhancement of early strengths, with simultaneously good compatibility, in dry mortar mixtures, with wafer-sensitive binders or those which set hydraulically with water, for example cement. An especially preferred object of the present invention is that the final strengths of the building material mixtures are not adversely affected when the early strengths are effectively enhanced.

The object of the invention is achieved by a solid composition comprising calcium silicate hydrate and at least one water-swellable polymer which can form a hydrogel, and also by a process for producing the solid compositions mentioned, wherein the following process steps are carried out:
a) mixing an aqueous suspension of calcium silicate hydrate with at least one water-swellable polymer which can form a hydrogel and
b) drying the product from step a) at temperatures below 140° C., preferably at temperatures less than 100° C., especially preferably at temperatures less than 80° C. and most preferably at temperatures between 15° C. and 80° C.

The object is also achieved by the use of the compositions as setting accelerators in building material mixtures comprising cement, slag sand, fly ash, silica dust, metakaolin, natural pozzolans, burnt oil shale and/or calcium aluminate cement, or in building material mixtures containing cement and binders based on calcium sulphate. Especially preferred are building material mixtures which contain essentially cement as a binder. The object is likewise achieved by the use of the inventive compositions as grinding aids in the preparation of cement. The object is also achieved by building material mixtures containing the inventive compositions and cement, slag sand, fly ash, silica dust, metakaolin, natural pozzolans, burnt oil shale and/or calcium aluminate cement, or building material mixtures containing the inventive compositions, cement and binders based on calcium sulphate.

The inventive composition is in the solid state. The composition is preferably pulverulent and is preferably suitable as a setting and hardening accelerator for cementitious binder systems. The water content in the inventive solid composition should preferably be less than 15% by weight, more preferably less than 10% by weight.

The inventive solid composition is preferably an accelerator composition. It comprises an inorganic and organs component. The inorganic component may be considered to be a modified, finely divided calcium silicate hydrate (C-S-H), which may comprise extraneous ions such as magnesium, aluminium or sulphate.

The calcium silicate hydrate (as the reactant for further processing) can first be prepared in the form of an aqueous suspension, preferably in the presence of a comb polymer plasticizer, as described in WO 2010/026155 A1 The suspensions can preferably be prepared by a process according to any of Claims 1 to 14 or 15 to 38 of WO 2010/026155 A1. This preferably involves the reaction of a water-soluble calcium compound with a water-soluble silicate compound, the reaction of the water-soluble calcium compound with the water-soluble silicate compound being effected in the presence of an aqueous solution which comprises a water soluble comb polymer suitable as a plasticizer for hydraulic binders.

Typically, this affords a suspension comprising the calcium silicate hydrate (C-S-H) in finely divided form. The solids content of the suspension is preferably between 5 and 35% by weight, more preferably between 10 and 30% by weight, especially preferably between 15 and 25% by weight.

The inorganic calcium silicate hydrate (C-S-H) component can be described in most cases, with regard to the composition thereof, by the following empirical formula:

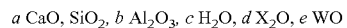

X is an alkali metal
W is an alkaline earth metal, W preferably being an alkaline earth metal other than calcium,

| | | |
|---|---|---|
| 0.1 ≤ a ≤ 2 | preferably | 0.66 ≤ a ≤ 1.8 |
| 0 ≤ b ≤ 1 | preferably | 0 ≤ b ≤ 0.1 |
| 1 ≤ c ≤ 6 | preferably | 1 ≤ c ≤ 6.0 |
| 0 ≤ d ≤ 1 | preferably | 0 ≤ d ≤ 0.4 |
| 0 ≤ e ≤ 2 | preferably | 0 ≤ e ≤ 0.1 |

The molar ratios are more preferably selected such that the preferred ranges for a, b and e are satisfied in the above empirical formula (0.66≤$a$≤1.8; 0≤$b$≤0.1; 0≤$e$≤0.1).

The calcium silicate hydrate in the inventive compositions is preferably in the form of foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-$C_2SH$, dellaite, jaffeite, rosenhahnite, killalaite and/or suolunite, more preferably in the form of xenotlite, 9 Å-tobermorite (riversiderite), 11 Å-tobermorite, 14 Å-tobermorite (plombierite), jennite, metajennite, afwillite and/or jaffeite. The molar ratio of calcium to silicon in the calcium silicate hydrate is preferably from 0.6 to 2 and more preferably from 1.0 to 1.8. The molar ratio of calcium to water in the calcium silicate hydrate is preferably 0.6 to 6, more preferably 0.6 to 2 and especially preferably 0.8 to 2.

The particle size of the calcium silicate hydrate (C-S-H) in the inventive solid compositions is preferably less than 1000 nm, more preferably less than 500 nm and especially preferably less than 200 nm, measured by light scattering with the ZetaSizer Nano instrument from Malvern.

The organic component of the composition is at least one water-swellable polymer which can form a hydrogel. Hydrogels are defined as a water-containing but water-insoluble polymers, the molecules of which are joined chemically, for example by covalent or ionic bonds, or physically, for example by interlooping of the polymer chains, to form a three-dimensional network. Linkage via covalent bonds to form a three-dimensional network is preferred. By virtue of incorporated hydrophilic polymer components, they swell in water with a considerable increase in volume, but without losing their material integrity. In doing so, they absorb considerable amounts of water. In the present invention, the water-swellable polymers which can form a hydrogel are the dried precursors of the hydrogels. The water-swellable polymers which can form a hydrogel are also referred to as superabsorbents. They can take up several times their own weight on contact with water. The absorption capacity of the inventive water-swellable polymers which can form a hydrogel is determined by the standard edana 441.2-02 developed for the hygiene industry, with the following modification to the standard. In the test, a 1% aqueous solution of calcium formate is used in place of a 0.9% aqueous NaCl solution. This method, also fcnown as the "teabag test" is performed by sealing a defined amount (about 200 mg) of superaborbent polymer into a teabag and immersing it into the 1% aqueous solution of calcium formate for 30 minutes. Subsequently, the teabag is left to drip for five minutes and weighed. A teabag containing no superabsorbent polymer is also tested as a blank value. To calculate the absorption capacity, the following formula is used:

absorption capacity=(final weight−blank value−starting weight)/starting weight (g/g)

The absorption capacity of the inventive water-swellable polymers which can form a hydrogel, tested according to the edana 441.2-02 standard using a 1% aqueous solution of calcium formate, is preferably more than 5 g/g, more preferably more than 15 g/g and especially preferably more than 20 g/g.

The water-swellable polymers which can form a hydrogel are preferably crosslinked hydrophilic polymers. Examples of inventive water-swellable polymers which can form a hydrogel include α) anionic crosslinked polyelectrolytes, β) cationic crosslinked polyelectrolytes, γ) ampholytic crosslinked polyelectrolytes and/or δ(nonionic crosslinked polymers, preferably nonionic crosslinked polymers from free-radical polymerization. It is possible to use one or more of the aforementioned alternative water-swellable polymers which can form a hydrogel. These alternatives are explained further in detail in the further preferred embodiments.

Less preferred among the group of the polyelectrolytes, especially of the α) anionic crosslinked polyelectrolytes and the γ) ampholytic crosslinked polyelectrolytes are water-swellable polymers leased on crosslinked polycarboxylates, especially on pure polycarbonates or on polymers with a very high polycarboxylate content since the water absorption capacity thereof in strongly ionic solutions (as is usually the case in building material mixtures) is only relatively weak. Such polymers are used, for example, in the hygiene industry.

In the present invention, it is advantageous to use those superabsorbents which have a high water absorption capacity even at high salt concentrations, especially high calcium ion concentrations, as typically present in cementitious aqueous systems. Preference is thus given to ionic water-swellable polymers which can form a hydrogel, especially α) anionic crosslinked polyelectrolytes, β) cationic crosslinked polyelectrolytes and/or γ) ampholytic crosslinked polyelectrolytes.

It is also possible to use δ) nonionic crosslinked copolymers which have a lower water absorption capacity which, however, is virtually unaffected by the salt content.

The water-swellable polymers which can form a hydrogel should also absorb the calcium silicate hydrate into the three-dimensional network when contacted with an aqueous suspension of fine calcium silicate hydrate (C-S-H). When the hydrogel thus formed is dried, the three-dimensional polymer network probably encloses the fine calcium silicate hydrate particles such that there is a certain degree of shielding from other calcium silicate hydrate particles. It is thus possible to substantially prevent agglomeration of the fine particles in the course of drying. It can be assumed that the stabilising effect of the inventive water-swellable polymers in the course of the drying process is based on the facts outlined above. Drying tests (for comparison) on fine calcium silicate hydrate (C-S-H) without a stabiliser or with addition of noninventive substances gave less effective accelerators. This is attributed to agglomeration of the calcium silicate hydrate (C-S-H) particles in the absence of the inventive stabiliser. Only with the use of water-swellable polymers which can form a hydrogel did it become possible to stabilise the fine calcium silicate hydrate particles (which are substantially stable in the aqueous suspension) in the course of drying too, such that they can be converted to the solid state without significant loss of efficacy (as accelerators).

Preference is given to solid compositions comprising calcium silicate hydrate and at least one water-swellable polymer which can form a hydrogel, said calcium silicate hydrate not originating from a hydration reaction of (portland) cement with water.

Preference is given to solid compositions comprising calcium silicate hydrate and at least one water-swellable polymer which can form a hydrogel, said solid composition not comprising any (portland) cement. Particular preference is given to solid compositions comprising calcium silicate hydrate and at least one water-swellable polymer which can form a hydrogel, said solid composition not comprising any (portland) cement which has come into contact with water. (Portland) cement which has come into contact with water shall also be understood to mean mixtures of (portland) cement and water which have now dried and which may contain a preferably low water content.

Preferred embodiments of the water-swellable polymers are specified in the dependent claims and are explained hereinafter.

In a preferred embodiment of the invention, the weight ratio of the water-swellable polymer which can form a hydrogel to the calcium silicate hydrate is from 1:10 to 3:1, more preferably from 1:5 to 2:1. In the case of use of less water-swellable polymer then corresponds to the aforementioned weight ratio, the stabilising effect of the water-swellable polymers in the course of drying becomes too weak, and the efficiency as an accelerator of the compositions in the solid state declines. Even greater amounts of stabilizer do not bring about any significant further improvement. In the efficacy of the accelerators; the compositions are barely economically viable any more.

Preference is given to compositions in which the water-swellable polymer which can form a hydrogel is selected from the group of α) anionic crosslinked polyelectrolytes,
β) cationic crosslinked polyelectrolytes,
γ) ampholytic crosslinked polyelectrolytes and/or
δ) nonionic crosslinked polymers, preferably nonionic crosslinked polymers from free-radical polymerization.

The term "crosslinked" preferably means that at least one crosslinker group is present in the particular water-swellable polymers, which bring about formation of a preferably covalent bond between at least two polymer constituents other than the crosslinker group. The configuration of the bond formed between the polymer constituents by the crosslinker group is preferably such that there is preferably a branch at the bond formation points. The term "crosslinked" more preferably means that more than one crosslinker group is present in the particular water-swellable polymers, which bring about formation of a plurality of preferably covalent bonds between polymer constituents other than the crosslinker group.

Especially preferred are crosslinking structural units which derive from monomers which have polyethylenically unsaturated vinyl groups. These can be reacted, for example, together with free-radically polymerizable monomers having only one ethylenically unsaturated vinyl group in a free-radical (co)polymerization to give the particular water-swellable polymers.

The alternative α) of the anionic crosslinked polyelectrolytes comprises polymers which comprise, as anionic groups, preferably sulphonates, sulphates, phosphates and/or phosphites. Sulphonates are particularly preferred as the anionic group. Less preferred are polymers having a very high proportion of carboxylate groups. Carbonates ere less preferred because they cannot develop strong water absorption and efficacy as superabsorbents in aqueous systems with a high ion content, especially a high calcium content. The proportion of carboxytate groups based on the total amount of all anionic groups is preferably less than 40 mol %.

The alternative β) of the cationic crosslinked polyelectrolytes comprises polymers which have preferably quaternary ammonium salts as cationic groups.

The alternative γ) of ampholytic crosslinked polyelectrolytes comprises polymers which contain both anionic groups, preferably the anionic groups mentioned above under α), and cationic groups, preferably the cationic groups mentioned above under β). The ratio of the number of anionic to cationic groups is preferably between 95:5 and 5:95, more preferably between 80:20 and 20:80.

Preferably, the α) anionic crosslinked polyelectrolytes, β) cationic crosslinked polyelectrolytes and γ) ampholytic crosslinked polyelectrolytes are obtained from free-radical polymerization.

The alternative δ) of nonionic crosslinked polymers comprises nonionic polymers. These polymers are preferably hydrophilic in order to achieve sufficient water absorption capacity in spite of the absence of charges. The nonionic crosslinked polymers are preferably obtained from free-radical polymerization.

When the α) anionic crosslinked polyeleotrolytes, β) nonionic crosslinked polyelectrolytes, γ) ampholytic crosslinked polyelectrolytes or δ) nonionic crosslinked polymers are obtained from free-radical polymerization, preference is given to using monomers which bring about crosslinking to give a three-dimensional network. The crosslinking monomers preferably have polyethylenically unsaturated vinyl groups which are suitable for free-radical polymerization. There is a more detailed description of the crosslinking monomers in the description of further preferred embodiments of the invention.

Preferably, both the anionic, cationic and ampholytic crosslinked polyelectrolytes and the nonionic crosslinked polymers are obtained by free-radical polymerization of corresponding charged or uncharged monomers. In the anionic and cationic alternatives, only the correspondingly charged monomers are used; in the case of the ampholytic polyelectrolytes, both anionic and cationic monomers are used. In the case of the nonionic crosslinked polymers, uncharged monomers are used. However, nonionic, i.e. uncharged, monomers are not ruled out in any of the three alternatives α), β) and γ).

The polymers of alternative α) preferably contain structural units which derive from anionic monomers, especially preferably from sulphonates. The polymers of alternative α) preferably contain structural units which derive from anionic monomers, preferably from sulphonates, in an amount of 5 to 99.99 mol %, more preferably 20 to 80 mol %, based on the sum of all monomers.

The polymers of alternative β) preferably contain structural units which derive from cationic monomers in an amount of 5 to 99.99 mol %, more preferably 20 to 80 mol %, based on the sum of all monomers.

In the γ) ampholytic crosslinked polyelectrolytes, the sum of structural units which derive from anionic and cationic monomers, based on the sum of all monomers, is preferably greater than 5 mol %, more preferably greater than 20 mol %. The ratio of structural units which derive from anionic monomers to structural units which derive from cationic monomers is preferably from 95:5 to 5:95, more preferably torn 80:20 to 20:80.

The inventive water-swellable polymers can be prepared in a manner known per se by joining the monomers which form the particular structural units by free-radical polymerization. All monomers present as acids can be polymerized as free acids or in the salt form thereof. In addition, the acids can also be neutralized by adding appropriate bases after the copolymerization; partial neutralization before or after the polymerization is likewise possible. The monomers or the copolymers can be neutralized, for example, with the bases sodium hydroxide, potassium hydroxide, calcium hydroxide, magnesium hydroxide and/or ammonia. Likewise suitable as bases are primary, secondary or tertiary $C_1$-$C_{20}$-alkylamines, $C_1$-$C_{20}$alkanolamines, $C_5$-$C_8$-cycloalkylamines and/or $C_6$-$C_{14}$ arylamines, each having branched or unbranched alkyl groups. It is possible to use one or more bases. Preference is given to neutralization with alkali metal hydroxides and/or ammonia, particular preference being given to sodium hydroxide. The inorganic or organic bases should be selected such that they form salts having relatively good water solubility with the particular acid.

The monomers are copolymerized preferably by free-radical bulk, solution, gel emulsion, dispersion or suspension polymerization. Since the inventive products are hydrophilic, water-swellable copolymers, polymerization in the aqueous phase, polymerization in inverse emulsion, or polymerization in inverse suspension is preferred. In particularly preferred embodiments, the reaction is affected as a gel polymerization or as an inverse suspension polymerization in organic solvents.

In a particularly preferred embodiment, the preparation of the superabsorbent polymer can be performed as an adiabatic polymerization, and can be initiated either with a redox initiator system or with a photoinitiator. In addition, a combination of both initiation variants is possible. The redox initiator system consists of at least two components, an organic or inorganic oxidizing agent and an organic or inorganic reducing agent. Frequently, compounds with peroxide units are used, for example inorganic peroxides such as alkali metal and ammonium persulphate, alkali metal and ammonium perphosphate, hydrogen peroxide and salts thereof (sodium peroxide, barium peroxide), or organic peroxides such as benzoyl peroxide, butyl hydroperoxide, or peracids such as peracetic acid. In addition, it is also possible to use other oxidizing agents, for example potassium permanganate, sodium and potassium chlorate, potassium dichromate, etc. The reducing agents used may be sulphur compounds such as sulphites, thiosulphates, sulphinic acid, organic thiols (for example ethylmercaptan, 2-hydroxyethanethiol, 2-mercaptoethylammonium chloride, thioglycolic acid) and others. In addition, ascorbic acid and low-valency metal salts are possible [copper(I); manganese(II); Iron(II)]. It is also possible to use phosphorus compounds, for example sodium hypophosphite.

In the case of a photopolymerization, it is initiated with UV light which brings about the decomposition of a photoinitiator. The photoinitiator used may, for example, be benzoin and benzoin derivatives, such as benzoin ether, benzil and derivatives thereof, such as benzil ketals, aryldiazonium salts, azoinitiators, for example 2,2'-azobis-(isobutyronitrile), 2,2'-azobis(2-amidinopropane) hydrochloride and/or acetophenone derivatives.

The proportion by weight of the oxidizing and reducing components in the case of redox initiator systems is preferably in each case in the range between 0.00005 and 0.5% by weight, more preferably in each case between 0.001 and 0.1% by weight. For photoinitiators, this range is preferably between 0.001 and 0.1% by weight, more preferably between 0.002 and 0.05% by weight. The percentages by weight mentioned for oxidising and reducing components and photoinitiators are each based on the mass of the monomers used for copolymerization.

The copolymerization is preferably performed in aqueous solution, preferably in concentrated aqueous solution, batchwise in a polymerization vessel (batch process) or continuously by the "continuous belt" method described in U.S. Pat. No. 4,857,610. A further possibility is polymerization in a continuous or batchwise kneading reactor. The operation is initiated typically at a temperature between −20 and 20° C., preferably between −10 and 10° C., and performed at atmospheric pressure without external supply of heat, and a maximum end temperature of 50 to 150° C. depending on the monomer content is obtained as a result of the heat of polymerization. The end of the copolymerization is generally followed by grinding of the polymer gel. In the case that the synthesis is performed on the laboratory scale, the ground gel is dried in a forced air drying cabinet at 70 to 180° C., preferably at 80 to 150° C. On the industrial scale, the drying can also be effected continuously in the same temperature ranges, for example on a belt dryer or in a fluidized bed dryer.

In a further preferred embodiment, the copolymerization is effected as an inverse suspension polymerization of the aqueous monomer phase in an organic solvent. The procedure here is preferably to polymerize the monomer mixture which has been dissolved in water and optionally neutralized in the presence of an organic solvent in which the aqueous monomer phase is insoluble or sparingly soluble. Preference is given to working in the presence of "water in oil" emulsifiers (W/O emulsifiers) and/or protective colloids based on low or high molecular weight compounds, which are used in proportions of 0.05 to 5% by weight, preferably 0.1 to 3% by weight, based on the monomers. The W/O emulsifiers and protective colloids are also referred to as stabilizers. It is possible to use customary compounds known as stabilisers in inverse suspension polymerization technology, such as hydroxypropylcellulose, ethylcellulose, methylcellulose, cellulose acetate butyrate mixed ethers, copolymers of ethylene and vinyl acetate and of styrene and butyl acrylate, polyoxyethylene sorbitan monooleate, laurate and stearate, and block copolymers formed from propylene oxide and/or ethylene oxide.

The organic solvents used may, for example, be linear aliphatic hydrocarbons such as n-pentane, n-hexane, n-heptane, branched aliphatic hydrocarbons (isoparaffins), cycloaliphatic hydrocarbons such as cyclohexane and decalin, and aromatic hydrocarbons such as benzene, toluene and xylene. Additionally suitable are alcohols, ketones, carboxylic esters, nitro compounds, halogenated hydrocarbons, ethers and many other organic solvents. Preference is given to those organic solvents which form azeotropic mixtures with water, particular preference to those which have a maximum water content in the azeotrope.

The water-swellable copolymers are initially obtained in swollen form as finely divided aqueous droplets in the organic suspension medium and are preferably isolated by removing the water as solid spherical particles in the organic suspension medium. Removal of the suspension medium and drying leaves a pulverulent solid. Inverse suspension polymerization is known to have the advantage that variation of the polymerization conditions allows the particle size distribution of the powders to be controlled, thus usually allowing an additional process step (grinding operate) to establish the particle size distribution to be avoided.

A preferred embodiment of the invention is that of compositions which are characterized in that sulpho-containing structural units of the general formula (I) are present in the anionic crosslinked polyelectrolytes α), preferably in an amount of 5 to 99.99 mol %, more preferably 20 to 80 mol %,

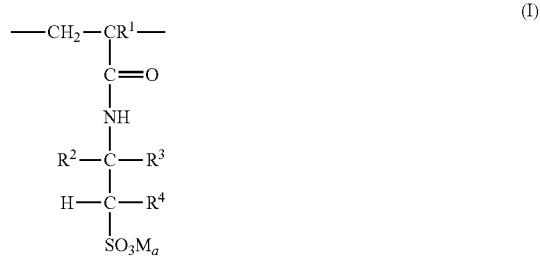

(I)

in which

R¹ is identical or different and is represented by hydrogen and/or a methyl radical, R², R³, R⁴ are each the same or different and are each independently represented ay hydrogen, an aliphatic branched or unbranched hydrocarbyl radical having 1 to 6 carbon atoms and/or aromatic hydrocarbyl radical having 6 to 14 carbon atoms, M is the same or different and is represented by hydrogen, a mono- or divalent metal cation and/or an ammonium ion, a is the same or different and is represented by ½ and/or 1. In the case of divalent metal cations, a assumes the value of ½.

The sulpho group-containing structural unit corresponding to the general formula (I) preferably originates from the copolymerization of one or more of the monomer species 2-acrylamido-2-methylpropanesulphonic acid, 2-methacrylamido-2-methylpropanesulphonic acid, 2-acrylamidobutanesulphonic acid and/or 2-acrylamido-2,4,4-trimethylpentanesulphonic acid, or the salts of each of the acids mentioned. Particular preference is given to 2-acrylamido-2-methylpropanesulphonic acid and the salt compounds thereof. The cations which form part of the salt compounds of the acids may each be present as mono- or divalent metal cations, such as preferably sodium, potassium, calcium or magnesium ions, or as ammonium ions which derive from ammonia, primary, secondary or tertiary $C_1$-$C_{20}$-alkylamines, $C_1$-$C_{20}$-alkanolamines, $C_5$-$C_8$-cycloalkylamines and $C_6$-$C_{14}$-arylamines. The alkyl radicals may each be branched or unbranched. Examples of corresponding amines are methylamine, dimethylamine, trimethylamine, ethanolamine, diethanolamine, triethanolamine, cyclohexylamine, dicyclohexylamine, phenylamine and diphenylamine. Preferred cations are alkali metal ions and/or ammonium ions, particular preference being given to the sodium ion.

A further anionic monomer component used in the polymerization in the α) anionic crosslinked polyelectrolytes, and also in the γ) ampholytic crosslinked polyelectrolytes, may additionally be ethylenically unsaturated, water-soluble carboxylic acids and/or carboxylic anhydrides, preferably in an amount of less than 40 mol %, more preferably less than 25 mol %, based on the total number of moles of all monomers in the water-swellable polymer. The ethylenically unsaturated carboxylic acids may, for example, be acrylic acid, methacrylic acid, ethacrylic acid, α-chloroacrylic acid, α-cyanoacrylic acid, β-methacrylic acid (crotonic acid), α-phenylacrylic acid, α-cyanoacrylic acid, sorbic acid, α-chlorosorbic acid, 2'-methylisocrotonic acid, cinnamic acid, p-chlorocinnamic acid, β-stearylacrylic acid, maleic acid, itaconic acid, citraconic acid, mesaconic acid, glutaconic acid, aconitic acid, maleic acid, fumaric acid and/or tricarboxyethylene. The carboxylic anhydride used may be maleic anhydride. The aforementioned further anionic monomer components may also be present as the anionic component in the γ) ampholytic crosslinked polyelectrolytes, preferably in an amount of less than 40 mol %, more preferably less than 25 mol %, based on the total number of moles of all monomers in the water-swellable polymer.

A preferred embodiment of the invention is that of compositions which are characterized in that cationic structural units which have a quaternized nitrogen atom and are of the general formula (II) are present in the cationic crosslinked polyelectrolytes β), preferably in an amount of 5 to 99.99 mol %, more preferably 20 to 80 mol %,

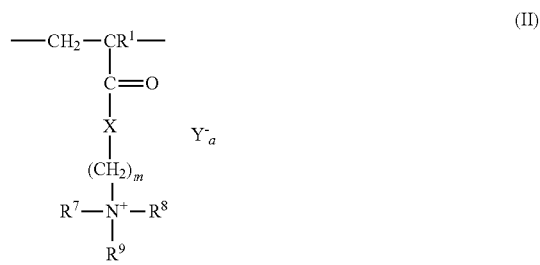

in which

R¹ is identical or different and is represented by hydrogen and/or a methyl radical, R⁷, R⁸, R⁹, R¹⁰ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms and/or an aryl radical having 6 to 14 carton atoms, m is the same or different and is represented by an integer from 1 to 6, X is the same or different and is represented by oxygen and/or N—R¹⁰, $Y^-_a$ is the same or different and is represented by a halide, $C_1$-$C_4$-alkylsulphate, $C_1$-$C_4$-alkylsulphonate and/or sulphate, a is the same or different and is represented by ½ and/or 1. In the case of doubly charged ions such as sulphate, a assumes the value of ½.

In the cationic water-swellable polyelectrolytes, the structural unit which has a quaternized nitrogen atom and corresponds to the general formula (III) preferably originates from the polymerization of one or more monomer species selected from the group of [2-(acryloyloxy)ethyl]trimethylammonium salts, [2-(methacryloyloxy)ethyl]-trimethylammonium salts. [3-(acryloylamino)propyl]trimethylammonium salts and/or [3-(methacryloylamino)propyl]trimethylammonium salts.

Preference is given to compositions which are characterized in that sulpho-containing structural units of the general formula (I) and cationic structural units which have a quaternized nitrogen atom and are of the general formula (II) are present in the γ) ampholytic crosslinked polyelectrolytes. The structural formulae (I) and (II) have already bean described above. The anionic monomers of the formula (I) are present in the γ) ampholytic crosslinked polyelectrolytes preferably in an amount of 5 to 95 mol %, and the cationic monomers of the formula (II) preferably in an amount of 5 to 95 mol %. The sum of the cationic and anionic polymers is preferably 5 mol % to 99.99 mol %, more preferably 20 mol % to 80 mol %. The above figures in mol % are each based on the sum of all structural units obtainable by free-radical polymerization, in other words on the sum of all monomers in the particular polymers.

Preference is given to compositions which are characterized in that (meth)acrylamido-containing structural units of the general formula (III) are present in the α) anionic crosslinked polyelectrolytes, in the β) cationic crosslinked polyelectrolytes and/or γ) in the ampholytic crosslinked polyelectrolytes, preferably in an amount of 30 to 94 mol %, more preferably in an amount of 40 to 80 mol %, based in each case on the total number of all structural units obtainable by free-radical polymerization,

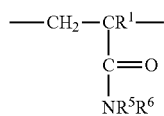

(III)

in which

R¹ is as defined above,

R⁵ and R⁶ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms and/or an aryl radical having 6 to 14 carbon atoms.

For example, the structural units (III) originate from the copolymerization of one or more of the monomer species acrylamide, methacrylamide, N-methyl(meth)acrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide. Preference is given to methylacrylamide, N,N-dimethylacrylamide and methacrylamide, particular preference to acrylamide. In the anionic, in the cationic and in the ampholytic crosslinked polyelectrolytes, the (meth)acrylamido-containing structural units of the structural formula (III) are present preferably from 30 to 94 mol %, preferably from 40 to 80 mol % and most preferably from 50 to 70 mol %, based in each case on the total number of all structural units obtainable by free-radical polymerization.

In a further preferred embodiment, the δ) nonionic crosslinked polymers which can form a hydrogel contain (meth)acrylamido-containing structural units of the general formula (III). The formula (III) has been explained above. The structural units (III) preferably originate from the copolymerization of one or more of the likewise aforementioned acrylamido-containing monomer species. Preference is given again to (meth)acrylamide and N,N-dimethyl(meth)acrylamide, particular preference to acrylamide. The structural units of the formula (III) are present preferably in an amount of 50 to 99.99 mol %, based in each case on the total number of all structural units obtainable by free-radical polymerization.

In a preferred embodiment, the invention relates to compositions wherein the alternatives α) anionic crosslinked polyelectrolytes,
β) cationic crosslinked polyelectrolytes,
γ) ampholytic crosslinked polyelectrolytes and/or
γ) nonionic crosslinked polymers, are characterized in that the water-swellable polymer which can form a hydrogel contains structural units which derive from monomers which have only one free-radically polymerizable, ethylenically unsaturated vinyl group, and crosslinking structural units which derive from monomers which have polyethylenically unsaturated vinyl groups, and the proportion of structural units which derive from monomers which have polyethylenically unsaturated vinyl groups is preferably from 0.01 to 10 mol %, mom preferably 0.1 to 5 mol %, based on the sum of all monomers.

In the case of alternatives α), β), γ) and δ), the polymers can preferably be crosslinked to give a three-dimensional network during the free-radical polymerization, by copolymerization of crosslinking structural units which derive from monomers which have polyethylenically unsaturated vinyl groups. In the particular water-swellable polymers α), β), γ) or δ), the proportion of structural units which derive from monomers which have polyethylenically unsaturated vinyl groups is preferably from 0.01 to 10 mol %, more preferably 0.1 to 5 mol %, based on the sum of all monomers in the particular water-swellable polymer. The effect of the polyethylenically unsaturated vinyl groups is based on the fact that they lead to the formation of a network by crosslinking, or bring about bridging of polymer chains. Without crosslinking monomers, straight-chain polymers would be obtained, as is well known.

For example, the structural units which derive from monomers which have polyethylenically unsaturated vinyl groups (crosslinker monomers) have at least two (meth)acrylate groups, vinyl ether groups, allyl groups and/or (meth)acrylamide groups.

A distinction is drawn between hydrolysis-labile and hydrolysis-stable crosslinkers. A hydrolysis-stable crosslinker shall be understood to mean a crosslinker which—incorporated within the network—maintains its crosslinking action irrespective of pH, especially preferably even at a high pH greater than 7, preferably greater than 9. The linking points of the network, which are preferably introduced by free-radical polymerization of crosslinker monomers with polyethylenically unsaturated vinyl groups, thus cannot be broken up by altering the pH of the swelling medium. The swelling medium shall be understood to mean the aqueous building material mixture into which the inventive compositions are introduced for the purpose of accelerating setting and to enhance early strengths. This mixture is usually strongly alkaline due to the cement content. Examples of hydrolysis-stable crosslinkers are N,N'-methylene-bis(meth)acrylamide and monomers having more than one maleimide group per molecule, such as hexamethylenebismaleimide; monomers having more than one vinyl ether group per molecule, such as ethylene glycol divinyl ether, triethylene glycol divinyl ether and/or cyclohexanediol divinyl ether, for example cyclohexane-1,4-diol divinyl ether. It is also possible to use allylamino or allylammonium compounds having more than one allyl group, such as triallylamine and/or tetraallylammonium salts. The hydrolysis-stable crosslinkers also include the allyl ethers, such as tetraallyloxyethane and pentaerythrityl triallyl ether.

In some applications, particularly when solid systems such as tile adhesives are involved, it is advantageous to use hydrolysis-stable crosslinkers since they act as superabsorbents when the dry mortar or the tile adhesive is made up with water. Some of the water is withdrawn from the building material and the dosage of other additives such as dispersion powders and cellulose ethers can advantageously be reduced. This effect has bean described in DE 10 2007 027470 A1. These contrast with hydrolysis-labile crosslinkers which—incorporated within the network—can lose their crosslinking action as a result of a change in the pH, especially an increase in the pH. It will be appreciated that it is also possible to combine hydrolysis-labile and hydrolysis-stable crosslinkers.

Preference is given to compositions which are characterized in that less than 40 mol %, more preferably less than 25 mol %, of carboxylic monomers, preferably monocarboxylic monomers, is present in the water-swellable polymers which are obtained by free-radical polymerization, based on the total number of moles of all monomers. Due to their anionic character, carboxylic monomers can be polymerized especially in the α) anionic crosslinked polyelectrolytes and/or in the γ) ampholytic crosslinked polyelectrolytes.

In the water-swellable polymers which are preferably obtained from a free-radical polymerization, it is possible to use further monomers for polymerization, for example acrylonitrile, methacrylonitrile, vinylpyridine, isoprenol, hydroxybutyl vinyl ether, hydroxyethyl vinyl ether or alkoxylates, preferably ethoxylates, of the aforementioned ethylenically unsaturated alcohols, esters of (meth)acrylic acid with alkyl polyalkylene glycols (preferably methyl polyethylene glycols (M-PEG)) styrene, vinyl acetate and/or hydroxyl-containing (meth)acrylic esters such as hydroxyethyl (meth)acrylate and/or hydroxypropyl (meth)acrylate. It is possible with preference for tristyrylphenol polyethylene glycol-1100 methacrylate, behenyl polyethylene glycol-1100 methacrylate, stearyl polyethylene glycol-1100 methacrylate, tristyrylphenol polyethylene glycol-1100 acrylate, tristyrylphenol polyethene glycol-1100 monovinyl ether, behenylpolyethene glycol-1100 monovinyl ether, stearylpolyethane glycol-1100 monovinyl ether, tristyrylphenol polyethylene glycol-1100 vinyloxybutyl ether, behenyl polyethylene glycol-1100 vinyloxybutyl ether, tristyrylphenol polyethylene glycol-block-propylene glycol allyl ether, behenyl polyethylene glycol-block-propylene glycol allyl ether, stearyl polyethylene glycol-block-propylene glycol allyl ether, allyl polyethylene glycol-(350 to 2000), methyl polyethylene glycol-(350 to 2000) monovinyl ether, polyethylene glycol-(500 to 5000) vinyloxybutyl ether, polyethylene glycol-block-propylene glycol-(500 to 5000) vinyloxybutyl ether and methyl polyethylene glycol-block-propylene glycol allyl ether to be present.

Preferably, the structural units which derive from a copolymerization of the nonionic monomers mentioned in the previous paragraph are present in an amount of 1 to 30 mol %, more preferably 2 to 15 mol %, based on the total number of all monomers in the water-swellable polymers.

It is preferred that the hydrolysis-labile crosslinking structural units arrive from monomers which are hydrolysed at a pH of 9 to 14 in an aqueous environment. When cementitious binder systems are made up with water, a very high pH is typically established. The high pH can lead, for example, to the hydrolysis of ester bonds. Hydrolysis-labile crosslinkers may be: poly-(meth)acryloyl-functional monomers such as 1,4-butanediol diacrylate, 1,4-butanediol dimethacrylate, 1,3-butyleneglycol diacrylate, 1,3-butylene glycol dimethacrylate, diethylene glycol diacrylate, diethylene glycol dimethacrylate, ethylene glycol diacrylate, ethylene glycol dimethacrylate, ethoxylated bisphenol A diacrylate, ethoxylated bisphenol A dimethacrylate, 1,6-hexanediol diacrylate, 1,6-hexanediol dimethacrylate, neopentyl glycol dimethacrylate, polyethylene glycol diacrylate, polyethylene glycol dimethacrylate, triethylene glycol diacrylate, triethylene glycol dimethacrylate, tripropylene glycol diacrylate, tetraethylene glycol diacrylate, tetraethylene glycol dimethacrylate, dipentaerythrityl pentaacrylate, pentaerythrityl tetraacrylate, pentaerythrityl triacrylate, trimethylolpropane triacrylate, trimethylolpropane trimethacrylate, cyclopentadiene diacrylate, tris(2-hydroxyethyl) isocyanurate triacrylate and/or tris(2-hydroxy)[ethyl]isocyanurate trimethacrylate; monomers having more than one vinyl ester or allyl ester group with an appropriate carboxyilc acid, such as divinyl esters of polycarboxylic acids, diallyl esters of polycarboxy acids, for example triallyl terephthalate, diallyl maleate, diallyl fumarate, trivinyl trimellitate, divinyl adipate and/or diallyl succinate. The hydrolysis-labile crosslinkers used may also be reaction products of ethylenically unsaturated dicarboxylic acids and/or dicarboxylic anhydrides with polyols, preferably triols. Preference is given to effecting the reaction in a molar ratio of unsaturated dicarboxylic acid to triol greater than 1:1, more preferably in a ratio greater than 2:1, especially greater than or equal to 3:1. The dicarboxylic acid used is especially preferably maleic acid or fumaric acid and/or the anhydride thereof. The triol components used may, for example, be butane-1,2,4-triol, n-pentane-1,2,5-triol, n-pentane-1,3,5-triol, n-hexane-1,2,5-triol, n-hexane-1,2,6-triol, n-pentane-1,3,5-triol, n-hexane-1,2,6-triol, n-hexane-1,2,5-triol and/or n-hexane-1,3,6-triol. Corresponding ester compounds with a plurality of ethylenically unsaturated vinyl groups suitable for free-radical polymerization are described in international patent application PCT/EP2010/059847 as oligomeric or polymeric component C. These compounds are suitable as hydrolysis-labile crosslinkers; the disclosure of PCT/EP2010/059847 with regard to component C is incorporated at this point by reference.

Esters of acrylates with alcohols are an example of esters which are relatively hydrolysis-sensitive at high pH. Especially preferred due to their relatively high hydrolysis rate in a basic medium, especially at a pH greater than 9, are esters of acrylates with poly-hydroxy-functional alcohols. Examples of particularly preferred hydrolysis-labile crosslinkers are 1,4-butanediol diacrylate, 1,3-butylene glycol diacrylate, diethylene glycol diacrylate, ethylene glycol diacrylate, ethoxylated bisphenol A diacrylate, 1,6-hexanediol diacrylate, polyethylene glycol diacrylate, triethylene glycol diacrylate, tripropylene glycol diacrylate, tetraethylene glycol diacrylate, dipentaerythrityl pentaacrylate, pentaerythrityl tetraacrylate, pentaerythrityl triacrylate, trimethylolpropane triacrylate, cyclopentadiene diacrylate and/or tris(2-hydroxyethyl) isocyanurate triacrylate.

The hydrolysis eliminates the crosslinking and hence the three-dimensional polymer network, and the influence on the rheology in aqueous building material mixtures, especially in cementitious systems, can be kept at a low level. Especially a thickening effect resulting from the water-withdrawing action of the water-swellable polymers may be undesired in some applications. Due to the hydrolysis-related degradation of the three-dimensional network, the rapid and efficient release of the calcium silicate hydrate particles effective as accelerators can also be ensured on introduction into aqueous cementitious building material mixtures. It is especially advantageous in the case of synthesis of the hydrolysis-labile water-swellable polymer (superabsorbent) to use a relatively high amount of chain-terminating reagent (chain regulator), in order to obtain relatively low molecular weight polymers, or polymer fragments, in use after hydrolysis of the crosslinker in aqueous cementitious building material mixtures. These low molecular weight polymers have a relatively minor influence on the rheology, especially a minor thickening effect. Suitable chain regulators are formic acid or salts thereof, e.g. sodium formate, compounds which comprise a mercapto group (R—SH) or a mercaptate group (R—S-M+), where the R radical here may in each case be an organic aliphatic or aromatic radical having 1 to 16 carbon atoms (e.g. mercapto-ethanol, 2-mercaptoethylamine, 2-mercaptoethylammonium chloride, thioglycolic acid, mercaptoethanesulphonate (sodium salt), cysteine, trismercaptotriazole (TMT) as the sodium salt, 3-mercaptotriazole, 2-mercapto-1-methylimidazole), compounds which comprise an R—S—S—R' group (disulphite group), where the R and R' radicals here may each independently be an organic aliphatic or aromatic radical having 1 to 16 carbon atoms (e.g. cystaminium dichloride, cysteine), phosphorus compounds such as hypophosphorous acid and salts thereof (e.g. sodium hypophosphite) or sulphur-containing inorganic salts such as sodium sulphite. It is also possible to use double bond-containing sulphonic acids, e.g. sodium methallyl sulphonate.

Particular preference is given to crosslinked polymers which are prepared by free-radical polymerization and comprise structural units which derive from monomers which are hydrolysed at a pH of 9 to 14 in an aqueous environment, the hydrolysis eliminating the crosslinking action, in the production of which conditions have been selected (especially the type and amount of the chain-terminating reagent) such that the hydrolysis gives rise to short fragments which influence the rheology of the mortar system to a minimum degree. The molecular weight $M_w$ of the fragments after the hydrolysis is preferably less than 1 000 000 g/mol, more preferably less than 500 000 g/mol.

The invention also relates to a process for producing preferably pulverulent compositions, wherein the following process steps are carried out;
a) contacting an aqueous suspension, preferably suitable as a setting and hardening accelerator for cementitious binder systems, with at least one water-swellable polymer which can form a hydrogel and
b) drying the product from step a) at temperatures below 140° C., preferably at temperatures less than 100° C., especially preferably at temperatures less than 80° C. and most preferably at temperatures between 15° C. and 80° C. The process, especially process steps a) and b), is preferably executed in the absence of (portland) cement. Step a) of the process can be effected, for example, by mixing a suitable suspension of fine calcium silicate hydrate with the water-swellable polymers. In general a hydrogel with a gel-like consistency is obtained in this step. This hydrogel is preferably comminuted for drying.

In the drying step, b), preferably low temperatures are employed, especially preferably low temperatures and reduced pressure. The drying temperature selected should preferably be less than 100° C. in order to prevent dehydration of the calcium silicate hydrate particles. For drying, for example, forced-air drying cabinets, vacuum drying cabinets or fluidized bed dryers are suitable. A preferred drying method is the fluidized bed process, since relatively high drying rates can be achieved.

A preferred process is that the aqueous suspension of calcium silicate hydrate used as the reactant in process step a) has been obtained by reacting a water-soluble calcium compound with a water-soluble silicate compound, the reaction of the water-soluble calcium compound with the water-soluble silicate compound being effected in the presence of an aqueous solution which preferably contains a water-soluble comb polymer which is suitable as a plasticizer for hydraulic binders. Reference is made to patent application WO 2010026155 A1, in which the corresponding processes for producing the aqueous suspension of calcium silicate hydrate and the water-soluble comb polymers which are suitable as plasticizers for hydraulic binders and are used therein are described. The content of WO 2010026155 is incorporated by reference at this point.

A further preferred embodiment of the process is characterized in that there follows a process step c) which comprises the grinding of the dried products from process step b) to powders. The particle size is preferably adjusted by the grinding such that more than 98% by weight of the particles pass through a screen of mesh size 350 μm, and more preferably more than 98% by weight of the particles pass through a screen of mesh size 200 μm. The grinding can preferably be effected by a centrifugal mill or an impact mill. The particle size is determined to standard edana 420.2-02. The advantage of grinding to powders is easier manageability; more particularly, homogeneous distribution of the inventive compositions in dry mortars is eased significantly, or actually made possible.

The invention also relates to the use at solid compositions comprising calcium silicate hydrate and at least one water-swellable polymer which can form a hydrogel as a setting accelerator in building material mixtures comprising cement, slag, sand, fly ash, silica dust, metakaolin, natural pozzolans, burnt oil shale and/or calcium aluminate cement, or in building material mixtures containing cement and binders based on calcium sulphate, preferably in building material mixtures which contain essentially cement as a hydraulic binder. Preference is given to the metered addition, based on the particular binder, especially preferably based on (portland) cement, of 0.1 to 5% by weight, more preferably of 0.1 to 2% by weight. The calcium silicate hydrate present in the inventive solid compositions preferably does not originate from a hydration reaction of (portland) cement with water. More preferably, the inventive solid compositions do not comprise any (portland) cement which has come into contact with water. (Portland) cement which has come into contact with water shall also be understood to mean mixtures of (portland) cement and water which have now dried and which may still contain a preferably low water content.

The inventive solid compositions are preferably used in dry mortar mixtures, especially in powder form.

The invention also relates to the use of the inventive compositions as a grinding aid in the production of cement, preferably in the grinding of the clinker or clinker blend to give the cement. A clinker blend is preferably understood to mean a mixture of clinker and substitutes such as slag, fly ash and/or pozzolans. These compositions are used in amounts of 0.001% by weight to 5% by weight, preferably in amounts of 0.01% by weight to 0.5% by weight, based in each case on the clinker or clinker blend to be ground. It is possible to use the inventive compositions as grinding aids in ball mills or else in vertical mills. The inventive compositions can be used as a grinding aid alone or else in combination with other grinding aids, for example mono-, di-, tri- and polyglycols, polyalcohols (for example glycerol of varying purities, for example from biodiesel production), amino alcohols (e.g. MEA, DEA, TEA, TIPA, THEED, DIHEIPA), organic acids and/or salts thereof (e.g. acetic acid and/or salts thereof, formates, gluconates), amino acids, sugars and residues from sugar production (e.g. molasses, vinasses), inorganic salts (chlorides, fluorides, nitrates, sulphates) and/or organic polymers, (e.g. polyether carboxylates (PCEs)). It has been found that especially the early strengths of the cement thus produced can be improved. Equally, the accelerator suspensions (in liquid form) disclosed in WO 2010026155 A1 and also the pulverulent accelerators disclosed in WO 2010026155 A1, are suitable as grinding aids in the production of cement from clinker or clinker blends. These grinding aids can likewise be used alone or in combination with the aforementioned list of grinding aids. It is possible here again to use either a ball mill or a vertical mill.

The invention also relates to the use of the inventive solid composition comprising calcium silicate hydrate and at least one water-swellable polymer which can form a hydrogel in a process for producing a sprayable composition which comprises a hydraulic binder and, as essential components, water, aggregates, hydraulic binders and accelerators, and is characterized in that the inventive composition comprising calcium silicate hydrate is added upstream of and/or at the spray nozzle. In preferred embodiments, the inventive solid compositions can be used according to one of the dependent claims of this patent application. Further preferred embodiments of the process for producing a hydraulically setting, sprayable hydraulic binder composition are described in international application PCT/EP2010/062671. The corresponding calcium silicate hydrate-based accelerators of this patent application can be used in an analogous manner in the processes of PCT/EP2010/062671. The content of PCT/EP2010/062671 is incorporated by reference at this point.

The invention relates to building material mixtures containing solid compositions of calcium silicate hydrate and at least one water-swellable polymer which can form a hydrogel and (portland) cement, slag sand, fly ash, silica dust, metakaolin, natural pozzolans, burnt oil shale and/or calcium aluminate cement, or building material mixtures containing cement and binders based on calcium sulphate, preferably building material mixtures which contain essentially cement as a hydraulic binder. Preferred building material mixtures are tile adhesive formulations, renders, adhesive and reinforcing mortars, grouting mortars, screeds and self-levelling underlayments.

Preference is given to building material mixtures containing solid compositions of calcium silicate hydrate and at least one water-swellable polymer which can form a hydrogel, and (portland) cement, slag sand, fly ash, silica dust, metakaolin, natural pozzolans, burnt oil shale and/or calcium aluminate cement, said calcium silicate hydrate not originating from a hydration reaction of (portland) cement with water.

Preference is given to building material mixtures containing solid compositions of calcium silicate hydrate and at least one water-swellable polymer which can form a hydrogel, and (portland) cement, slag sand, fly ash, silica dust, metakaolin, natural pozzolans, burnt oil shale and/or calcium aluminate cement, said solid composition not containing any (portland) cement which has come info contact with water. (Portland) cement which has come into contact with water shall also be understood to mean mixtures of (portland) cement and water which have now dried and which may contain a preferably low water content.

Binders based on calcium sulphate shall be understood, for example, to mean gypsum, hemihydrate and anhydrite.

The building material mixtures may comprise, as other admixtures, antifoams, air pore formers, fillers, redispersible polymer powders, retardants, thickeners, water retention aids and/or wetting agents.

EXAMPLES

Preparation of the Water-Swellable Polymers

Anionic hydrolysis-stable superabsorbent copolymer (Polymer 1):

A 2 l three-neck flask with stirrer and thermometer was initially charged with 160 g of water to which were then added successively 352.5 g (0.74 mol, 28 mol %) of 2-acrylamido-2-methylpropanesulphonic acid sodium salt (50 w.-% solution in water), 286.4 g (2.0 mol, 72 mol %) of acrylamide (50 w.-% solution in water) and 0.3 g (0.0021 mol, 0.08 mol %) of methylenebisacrylamide. After adjustment to pH 7 with 20% sodium hydroxide solution and purging with nitrogen for 30 minutes, the mixture was cooled to approx. 5° C. The solution was transferred to a plastic vessel with dimensions (w-d-h) 15 cm·10 cm·20 cm, to which were then added successively 16 g of one per cent 2,2'-azobis(2-amidinopropane) dihydrochloride solution, 20 g of one per cent sodium peroxodisulphate solution, 0.7 g of 1 w.-% Rongalit C solution, 16.2 g of 0.1% tert-butyl hydroperoxide solution and 2.5 g of 0.1 w.-% iron (II) sulphate heptahydrate solution. The copolymerization was started by irradiating with UV light (two Philips tubes; Cleo Performance 40 W), After approx. two hours, the hardened gel was removed from the plastic vessel and cut with scissors into cubes of edge length approx. 5 cm. Before the gel cubes were comminuted by means of a conventional meat grinder, they were lubricated with the Sitren 595 separating agent (polydimethylsiloxane emulsion; from Goldschmidt). The separating agent is a poly-dimethylsiloxane emulsion which has been diluted with water in a ratio of one to twenty. The resulting gel granules of the copolymer were distributed homogeneously on drying grids and dried to constant weight in a forced-air drying cabinet at approx. 120 to 140° C. Approx. 375 g of white hard granules were obtained, which were converted with the aid of a centrifugal mill to a pulverulent state.

Anionic acrylic acid-containing hydrolysis stable superabsorbent copolymer (Polymer 2):

A 2 l three-neck flask with stirrer and thermometer was initially charged with 200 g of water to which were added 27.1 (0.38 mol, 13 mol %) of acrylic acid (99.5 w.-% solution in water), and the mixture was neutralized with 29.4 g of sodium hydroxide solution (50 w.-% solution in water). Subsequently, 218.8 g (0.46 mol, 17 mol %) of 2-acrylamido-2-methylpropanesulphonic acid sodium salt (50 w.-% solution in water), 286.4 g (2.0 mol, 70 mol %), acrylamide (50 w.-% solution in water) and 1.1 g (0.0030 mol, 0.1 mol %) of pentaerythrityl allyl ether (70 w.-% solution m water) were added successively. After adjustment to pH 7 with 20% sodium hydroxide solution and purging with nitrogen for 30 minutes, the mixture was cooled to approx. 5° C. The solution was transferred to a plastic vessel with dimensions (w-d-h) 15 cm·10 cm·20 cm, to which were then added successively 16 g of 1 w.-% 2,2'-azobis(2-amidinopropane) dihydrochloride solution, 20 g of 1 w.-% sodium peroxodisulphate solution, 0.7 g of 1 w.-% Rongalit C solution. 16.2 g of 0.1 w.-% tert-butyl hydroperoxide solution and 2.5 g of 0.1 w.-% iron (II) sulphate heptahydrate solution. The copolymerization was started by irradiating with UV light (two Philips tubes; Cleo Performance 40 W). After approx. two hours, the hardened gel was removed from the plastic vessel and cut with scissors into cubes of edge length approx. 5 cm. Before the gel cubes were comminuted by means of a conventional meat grinder, they were lubricated with the Sitren 595 separating agent (polydimethylsiloxane emulsion; from Goldschmidt). The separating agent is a polydimethylsiloxane emulsion which has been diluted with water in a ratio of one to twenty. The resulting gel granules of the copolymer ware distributed homogeneously on drying grids and dried to constant weight in a forced-air drying cabinet at approx. 120 to 140° C. Approx. 280 g of white hard granules were obtained, which were converted with the aid of a centrifugal mill to a pulverulent state.

Mixed-ionic hydrolysis-stable superabsorbent copolymer (Polymer 3):

A 2 l three-neck flask with stirrer and thermometer was initially charged with 33 g of water to which were subsequently added successively 411.0 g (0.86 mol, 49.9 mol %) of 2-acrylamido-2-methylpropanesulphonic acid sodium salt (50 w.-% solution in water), 309.6 g (0.90 mol, 49.9 mol %) of 3[(acryloylamino)propyl]trimethylammonium chloride (60 w.-% solution in water) and 1.0 g (0.0027 mol, 0.2 mol %) of pentaerythrityl allyl ether (70 w.-% solution in water). After adjustment to pH 7 with 20% sodium hydroxide solution and purging with nitrogen for 30 minutes, the mixture was cooled to approx. 5° C. The solution was transferred to a plastic vessel with dimensions (w-d-h) 15 cm·10 cm·20 cm, to which were then added successively 16 g of 1 w.-% 2,2'-azobis(2-amidinopropane) dihydrochloride solution, 20 g of 1 w.-% sodium peroxodisulphate solution, 0.7 g of 1 w.-% Rongalit C solution, 16.2 g of 0.1 w.-% tert-butyl hydroperoxide solution and 2.5 g of 0.1 w.-% iron(II) sulphate heptahydrate solution. The copolymerizatien was started by irradiating with UV light (two Philips tubes; Cleo Performance 40 W) After approx. two hours, the hardened gel was removed from the plastic vessel and cut with scissors into cubes of edge length approx. 5 cm. Before the gel cubes were comminuted by means of a conventional meat grinder, they were lubricated with the Sitren 595 separating agent (polydimethylsiloxane emulsion; from Goldschmidt). The separating agent is a polydimethylsiloxane emulsion which has been diluted with water in a ratio of one to twenty.

The resulting gel granules of the copolymer were distributed homogeneously on drying grids and dried to constant weight in a forced-air drying cabinet at approx. 120 to 140° C. Approx. 390 g of white hard granules were obtained, which were converted with the aid of a centrifugal mill to a pulverulent state.

Anionic hydrolysis-labile superabsorbent copolymer (Polymer 4)

A 2 l three-neck flask with stirrer and thermometer was initially charged with 145 g of water to which were subsequently added successively 319.3 g (0.70 mol, 25.8 mol %) of 2-acrylamido-2-methylpropanesulphonic acid sodium salt (50 w.-% solution in water), 283.5 g (2.00 mol, 73.8 mol %) of acrylamide (50 w.-% solution in water) and 3.8 g (0.01 mol 0.4 mol %) of diethylene glycol diacrylate. After adding 6 g of sodium methallylsulphonate solution (10 w.-% solution in water), the pH was adjusted to 7 with 20% sodium hydroxide solution and, after purging with nitrogen for 30 minutes, cooled to approx. 10° C. The solution was transferred to a plastic vessel with dimensions (w-d-h) 15 cm·10 cm·20 cm, to which were then added successively 24 g of 1 w.-% 2,2'-azobis(2-amidinopropane) dihydrochloride solution, 0.7 g of 1 w.-% Rongalit C solution, 16 g of 0.1 w.-% tert-butyl hydroperoxide solution and 2.4 g of 0.1 w.-% iron(II) sulphate heptahydrate solution. The copolymerization was started by irradiating with UV light (two Philips tubes; Cleo Performance 40 W), After approx. two hours, the hardened gel was removed from the plastic vessel and cut with scissors into cubes of edge length approx. 5 cm. Before the gel cubes were comminuted by means of a conventional meat grinder, they were lubricated with the Sitren 595 separating agent (polydimethylsiloxane emulsion; from Goldschmidt). The separating agent is a polydimethylsiloxane emulsion which has been diluted with water in a ratio of one to twenty.

The resulting gel granules of the copolymer were distributed homogeneously on drying grids and dried to constant weight in a forced-air drying cabinet at approx. 100° C. Approx. 305 g of white hard granules were obtained, which were converted with the aid of a centrifugal mill to a pulverulent state.

Nonionic hydrolysis-labile superabsorbent copolymer (Polymer 5)

A 2 l three-neck flask with stirrer and thermometer was initially charged with 270 g of water to which were subsequently successively 476.2 g (3.36 mol, 99.7 mol %) of acrylamide (50 w.-% solution in water) and 3.2 g (0.08 mol, 0.3 mol %) of diethylene glycol diacrylate. After addition of 7.5 g of formic acid solution (10 w.-% solution in water), the pH was adjusted to 7 with 20% sodium hydroxide solution and, after purging with nitrogen for 30 minutes, the mixture was cooled to approx. 10° C. The solution was transferred to a plastic vessel with dimensions (w-d-h) 15 cm·10 cm·20 cm, to which ware then added successively 24 g of 1 w.-% 2,2'-azobis(2-amidinopropane) dihydrochloride solution, 0.7 g of 1 w.-% Rongalit C solution, 16 g of 0.1 w.-% tert-butyl hydroperoxide solution and 2.4 g of 0.1 w.-% iron(II) sulphate heptahydrate solution. The copolymerization was started by irradiating with UV light (two Philips tubes; Cleo Performance 40 W). After approx. two hours, the hardened gel was removed from the plastic vessel and cut with scissors into cubes of edge length approx. 5 cm. Before the gel cubes ware comminuted by means of a conventional meat grinder, they were lubricated with the Sitren 595 separating agent (polydimethylsiloxane emulsion; from Goldschmidt). The separating agent is a polydimethylsiloxane emulsion which has been diluted with water in a ratio of one to twenty.

The resulting gel granules of the copolymer were distributed homogeneously on drying grids and dried to constant weight in a forced-air drying cabinet at approx. 100° C. Approx. 240 g of white hard granules were obtained, which were converted with the aid of a centrifugal mill to a pulverulent state.

Mixed-Ionic Hydrolysis-Labile Superabsorbent Copolymer (Polymer 6)

A 2 l three-neck flask with stirrer and thermometer was initially changed with 130 g of water to which were subsequently added successively 73.5 g (0.16 mol, 5.2 mol %) of 2-acrylamido-2-methylpropanesulphonic acid sodium salt (50 w.-% solution in water), 194.0 g (0.56 mol, 18 mol %) of 3-[(acryloylamino)propyl]trimethylammonium chloride (60 w.-% solution in water), 333.2 g (2.35 mol, 75.5 mol %) of acrylamide (50 w.-% solution in water) and 16.6 g (0.038 mol, 1.2 mol %) of polyethylene glycol-300 diacrylate. After addition of 6 g of formic acid solution (10 w.-% solution in water), the pH was adjusted to 7 with 20% sodium hydroxide solution and, after purging with nitrogen for 30 minutes, the mixture was cooled to approx. 10° C. The solution was transferred to a plastic vessel with dimensions (w-d-h) 15 cm·10 cm·20 cm, to which were then added successively 24 g of 1 w.-% 2,2'-azobis(2-amidinopropane) dihydrochloride solution, 0.7 g of 1 w.-% Rongalit C solution, 16 g of 0.1 w.-% tert-butyl hydroperoxide solution and 2.4 g of 0.1 w.-% iron(II) sulphate heptahydrate solution. The copolymerization was started by irradiating with UV light (two Philips tubes; Cleo Performance 40 W). After approx. two hours, the hardened gel was removed from the plastic vessel and cut with scissors into cubes of edge length approx. 5 cm. Before the gel cubes were comminuted by means of a conventional meat grinder, they were lubricated with the Sitren 595 separating agent (polydimethylsiloxane emulsion; from Goldschmidt). The separating agent is a polydimethylsiloxane emulsion which has been diluted with water in a ratio of one to twenty.

The resulting gel granules of the copolymer were distributed homogeneously on drying grids and dried to constant weight in a forced-air drying cabinet at approx. 100° C. Approx. 335 g of white hard granules were obtained, which were converted with the aid of a centrifugal mill to a pulverulent state.

Production of the Inventive Compositions

The calcium silicate hydrate-containing hydrogels were produced by interspersing one, or else more than one, water-swellable polymer into the product X-Seed®-100 (obtainable from BASF Construction Chemicals Europe AG).

A beaker was initially charged with 100 ml of X-Seed®-100 and stirred with a finger stirrer. The appropriate amount (see Table 1) of the particular superabsorbent particles (Polymers 1-6) was cautiously interspersed in, and the resulting gel was stirred for a further approx. 30 min. The gel obtained was ground and dried in a fluidized bed at 45° C. The dried gel was subsequently coarsely comminuted and converted to a pulverulent state with the aid of a centrifugal mill. The mean particle diameter of the polymer powder was 40 to 60 μm. The particle size was determined by standard edana 420.2-02.

TABLE 1

Inventive compositions:

|  | Weight of superabsorbent copolymer | Amount of X-Seed®-100 dispersion |
|---|---|---|
| Powder 1 | 10 g of Polymer 1 (anionic hydrolysis-stable superabsorbent copolymer) | 100 ml |
| Powder 2 | 10 g of Polymer 2 (acrylic acid-containing hydrolysis-stable superabsorbent copolymer) | 100 ml |
| Powder 3 | 5 g of Polymer 3 (mixed-ionic hydrolysis-stable superabsorbent copolymer) | 100 ml |
| Powder 4 | 5 g of Polymer 4 (anionic hydrolysis-labile superabsorbent copolymer) | 100 ml |
| Powder 5 | 5 g of Polymer 5 (nonionic hydrolysis-labile superabsorbent copolymer) | 100 ml |
| Powder 6 | 5 g of Polymer 6 (mixed-ionic hydrolysis-labile superabsorbent copolymer) | 100 ml |

Performance Tests

In order to test the efficacy of the inventive powders obtained, 6-hour strength were determined in a standard mortar (prisms analogous to DIN EN 196-1, but with a water/cement ratio of 0.55).

Standard mortar formulation;
250 g of water
1350 g of standard sand
450 g of CEM I 52.5 R Milke As reference tests, the following mixtures were tested:

Reference 1: blank without addition of accelerator

Reference 2: with aqueous X-Seed®-100 dispersion

Reference 3: with powder of an X-Seed®-100 dispersion which has been dried (at 60° C. in a forced-air drying cabinet) without addition of superabsorbent copolymers Reference 4: with powder of an X-Seed®-100 dispersion which has been dried (at 60° C. in a forced-air drying cabinet) with addition of 5 w.-% of Starvis® T 50 F (anionic polyacrylamide thickener)

In all cases, flexural tensile strengths and compressive strengths were determined after 6 hours and 28 days (Table 2).

TABLE 2

Flexural tensile and compressive strengths

|  | Dosage [g] | Flexural tensile strength [N/mm$^2$] after 6 h | Compressive strength [N/mm$^2$] after 6 h | Flexural tensile strength [N/mm$^2$] after 28 d | Compressive strength [N/mm$^2$] after 28 d |
|---|---|---|---|---|---|
| Reference 1 (blank) | — | not measureable, prism falls apart when demoulded | not measureable, prism falls apart when demoulded | 7.1 | 46.7 |
| Reference 2 (aqueous X-Seed®-100 dispersion[1]) | 32.1 | 2.1 | 6.8 | 8.2 | 55.5 |
| Reference 3 (X-Seed®-100 dispersion dried at 60° C.) | 7.9 | 0.9 | 2.7 | 9.5 | 47.1 |
| Reference 4 (X-Seed®-100 dispersion dried with Starvis® T 50 F[2] at 60° C.) | 6.4 | not measureable, prism falls apart when demoulded | not measureable, prism falls apart when demoulded | 6.2 | 36.9 |
| Powder 1 (contains anionic hydrolysis-stable superabsorbent copolymer) | 10.0 | 1.1 | 4.0 | 7.7 | 54.1 |
| Power 2 (contains acrylic acid-containing hydrolysis-stable superabsorbent copolymer) | 10.0 | 1.5 | 4.3 | 8.8 | 54.5 |
| Powder 3 (contains mixed-ionic hydrolysis-stable superabsorbent copolymer) | 8.4 | 1.0 | 3.9 | 7.0 | 44.5 |
| Powder 4 (contains anionic hydrolysis-labile superabsorbent copolymer) | 8.4 | 1.5 | 5.1 | 9.0 | 49.6 |
| Powder 5 (contains nonionic hydrolysis-labile superabsorbent copolymer) | 8.4 | 1.9 | 5.6 | 8.9 | 55.0 |

TABLE 2-continued

Flexural tensile and compressive strengths

| | Dosage [g] | Flexural tensile strength [N/mm²] after 6 h | Compressive strength [N/mm²] after 6 h | Flexural tensile strength [N/mm²] after 28 d | Compressive strength [N/mm²] after 28 d |
|---|---|---|---|---|---|
| Powder 6 (contains mixed-ionic hydrolysis-labile superabsorbent copolymer) | 8.4 | 1.7 | 5.0 | 7.7 | 47.5 |

[1]The mixing water of this mortar mixture was reduced by 25.7 g in order to establish the same water/cement ratio.
[2]Starvis ® T 50 F, product of BASF Construction Polymers GmbH, is an anionic polyacrylamide thickener.

When the inventive powders were used, it was shown that the activity of the inventive powders as accelerators in the course of drying is improved compared to reference tests 1, 3 and 4. Compared to the aqueous dispersion of Reference 2, only relatively small reductions in the particular development of compressive strength after 6 hours were observed. The accelerating effect was higher in the case of use of the hydrolysable water-swellable polymers (copolymers 4, 5 and 6) than in the case of use of the hydrolysis-stable superabsorbents (copolymers 1, 2 and 3), which led to the conclusion that the release of the C-S-H particles is promoted by the use of the hydrolysable crosslinkers. It can be assumed that the hydrolysis in the aqueous cementitious systems at the high pH values can result in more rapid "disentanglement" of the three-dimensional network of the superabsorbent, thus speeding up the release of the calcium silicate hydrate which is effective as an accelerator. The tests show that, even after the drying of the aqueous accelerator dispersion by the process according to the invention using water-swellable polymers which can form a hydrogel, a high activity as an accelerator is maintained. The action as an accelerator in the comparative tests with non-hydrogel-based chemistry (Reference 4) is similarly poor to the blank value (Reference 1) which is still not measurable after 6 hours. The final strengths (values after 28 days) are surprisingly not adversely affected, and in some cases even positively influenced (copolymers 1, 2 and 5) by the pulverulent accelerators compared to the blank value without addition of any additives (Reference 1).

The invention claimed is:

1. A solid composition comprising finely divided calcium silicate hydrate having a particle size of less than 500 nm and at least one water-swellable polymer which can form a hydrogel.

2. The composition according to claim 1, wherein the weight ratio of the water-swellable polymer which can form a hydrogel to the calcium silicate hydrate is from 1:10 to 3:1.

3. The composition according to claim 1, wherein the water-swellable polymer which can form a hydrogel is selected from the group of
   α) anionic crosslinked polyelectrolytes,
   β) cationic crosslinked polyelectrolytes,
   γ) ampholytic crosslinked polyelectrolytes,
   δ) nonionic crosslinked polymers, optionally nonionic crosslinked polymers from free-radical polymerization, and
   ε) combinations thereof.

4. The composition according to claim 3, wherein sulpho-containing structural units of the general formula (I) are present in the anionic crosslinked polyelectrolytes α), optionally in an amount of 5 to 99.99 mol %,

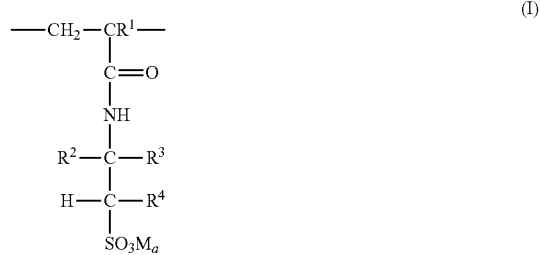

in which
$R^1$ is identical or different and is represented by hydrogen or a methyl radical,
$R^2$, $R^3$, $R^4$ are each the same or different and are each independently represented by hydrogen, an aliphatic branched or unbranched hydrocarbyl radical having 1 to 6 carbon atoms and/or aromatic hydrocarbyl radical having 6 to 14 carbon atoms,
M is the same or different and is represented by hydrogen, a mono- or divalent metal cation or an ammonium ion,
a is the same or different and is represented by 1/2 or 1.

5. The composition according to claim 3, wherein cationic structural units which have a quaternized nitrogen atom and are of the general formula (II) are present in the cationic crosslinked polyelectrolytes β), optionally in an amount of 5 to 99.99 mol %,

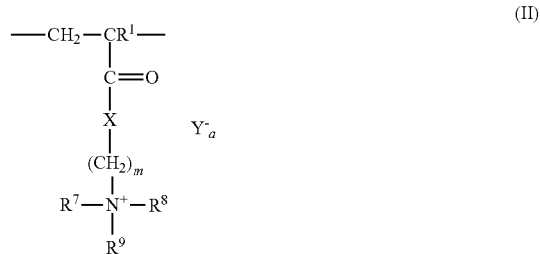

in which
$R^1$ is identical or different and is represented by hydrogen or a methyl radical,
$R^7$, $R^8$, $R^9$, $R^{10}$ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms or an aryl radical having 6 to 14 carbon atoms, m is the same or different and is represented by an integer from 1 to 6, X is the same or different and is represented by oxygen or N—R$^{10}$, Y$^-_a$ is the same or different and is represented by a halide, C$_1$-C$_4$-alkylsulphate, C$_1$-C$_4$-alkylsulphonate and/or sulphate, a is the same or different and is represented by 1/2 or 1.

6. The composition according to claim 3, wherein sulpho-containing structural units of the general formula (I) and cationic structural units which have a quaternized nitrogen atom and are of the general formula (II) are present in the γ) ampholytic crosslinked polyelectrolytes.

7. The composition according to claim 4, wherein (meth)acrylamido-containing structural units of the general formula (III) are present in the α) anionic crosslinked polyelectrolytes, in the β) cationic crosslinked polyelectrolytes or γ) in the ampholytic crosslinked polyelectrolytes, optionally in an amount of 30 to 94 mol %,

in which

R$^1$ is as defined above,

R$^5$ and R$^6$ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms or an aryl radical having 6 to 14 carbon atoms.

8. The composition according to claim 3, wherein the δ) nonionic crosslinked polymers which can form a hydrogel contain (meth)acrylamido-containing structural units of the general formula (III).

9. The composition according to claim 1, wherein the water-swellable polymer which can form a hydrogel contains structural units which derive from monomers which have only one free-radically polymerizable, ethylenically unsaturated vinyl group, and crosslinking structural units which derive from monomers which have polyethylenically unsaturated vinyl groups.

10. The composition according to claim 9, wherein less than 40 mol % of carboxylic monomers, optionally monocarboxylic monomers, is present in the water-swellable polymers, based on the total number of moles of all monomers.

11. The composition according to claim 9, wherein the crosslinking structural units derive from monomers which are hydrolysed at a pH of 9 to 14 in an aqueous environment.

12. A process for producing optionally pulverulent compositions according to claim 1, wherein the following process steps are carried out:
a) contacting an aqueous suspension, optionally suitable as a setting and hardening accelerator for cementitious binder systems, of calcium silicate hydrate with at least one water-swellable polymer which can form a hydrogel and
b) drying the product from step a) at temperatures below 140° C.

13. The process according to claim 12, wherein the aqueous suspension of fine calcium silicate hydrate has been obtained by reacting a water-soluble calcium compound with a water-soluble silicate compound, the reaction of the water-soluble calcium compound with the water-soluble silicate compound being effected in the presence of an aqueous solution which optionally contains a water-soluble comb polymer which is suitable as a plasticizer for hydraulic binders.

14. The process according to claim 12, wherein there follows a process step c) which comprises the grinding of the dried products from process step b) to powders.

15. A setting accelerator comprising a composition according to claim 1, for use in building material mixtures comprising cement, slag sand, fly ash, silica dust, metakaolin, natural pozzolans, burnt oil shale and/or calcium aluminate cement, or in building material mixtures containing cement and binders based on calcium sulphate, optionally in building material mixtures which contain essentially cement as a hydraulic binder.

16. A grinding aid comprising a composition according to claim 1, for use in the preparation of cement.

17. Building material mixtures containing a composition according to claim 1 and i) cement, slag sand, fly ash, silica dust, metakaolin, natural pozzolans, burnt oil shale and/or calcium aluminate cement, or ii) cement and binders based on calcium sulphate, optionally mixtures which contain essentially cement as a hydraulic binder.

18. The composition according to claim 5, wherein (meth)acrylamido-containing structural units of the general formula (III) are present in the α) anionic crosslinked polyelectrolytes, in the β) cationic crosslinked polyelectrolytes or γ) in the ampholytic crosslinked polyelectrolytes, optionally in an amount of 30 to 94 mol %,

in which

R$^1$ is as defined above,

R$^5$ and R$^6$ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms or an aryl radical having 6 to 14 carbon atoms.

19. The composition according to claim 6, wherein (meth)acrylamido-containing structural units of the general formula (III) are present in the α) anionic crosslinked polyelectrolytes, in the β) cationic crosslinked polyelectrolytes or γ) in the ampholytic crosslinked polyelectrolytes, optionally in an amount of 30 to 94 mol %,

in which

R$^1$ is as defined above,

R$^5$ and R$^6$ are each the same or different and are each independently represented by hydrogen, a branched or unbranched aliphatic hydrocarbyl radical having 1 to 20 carbon atoms, a cycloaliphatic hydrocarbyl radical having 5 to 8 carbon atoms or an aryl radical having 6 to 14 carbon atoms.

20. The composition according to claim 10, wherein the crosslinking structural units derive from monomers which are hydrolysed at a pH of 9 to 14 in an aqueous environment.

* * * * *